United States Patent
Parisa et al.

(10) Patent No.: US 11,200,107 B2
(45) Date of Patent: Dec. 14, 2021

(54) INCIDENT MANAGEMENT FOR TRIAGING SERVICE DISRUPTIONS

(71) Applicant: International Business Machines Corporation, Armonk, NY (US)

(72) Inventors: Venkata Vinay Kumar Parisa, Telangana (IN); Prasanta Kumar Pal, Orissa (IN); Biswajit Mohapatra, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/872,837

(22) Filed: May 12, 2020

(65) Prior Publication Data
US 2021/0357284 A1    Nov. 18, 2021

(51) Int. Cl.
*G06F 11/00* (2006.01)
*G06F 11/07* (2006.01)

(52) U.S. Cl.
CPC ...... *G06F 11/0772* (2013.01); *G06F 11/0709* (2013.01); *G06F 11/0751* (2013.01)

(58) Field of Classification Search
CPC ............. G06F 11/0772; G06F 11/0709; G06F 11/0751; G06F 11/0775; G06F 11/0769; G06F 11/0766
See application file for complete search history.

(56) References Cited

U.S. PATENT DOCUMENTS

| | | | |
|---|---|---|---|
| 2009/0055684 A1* | 2/2009 | Jamjoom | H04L 41/5074 714/26 |
| 2014/0223567 A1 | 8/2014 | Howes et al. | |
| 2014/0358610 A1 | 12/2014 | de Assuncao et al. | |
| 2015/0294087 A1 | 10/2015 | Torres et al. | |
| 2019/0318204 A1 | 10/2019 | Mishra et al. | |
| 2021/0135959 A1* | 5/2021 | Ricks | G06Q 10/00 |

OTHER PUBLICATIONS

BMC Blogs, "ITIL Incident Management", ITIL incident management 101, Dec. 22, 2016, https://www.bmc.com/blogs/itil-v3-incident-management/.

* cited by examiner

*Primary Examiner* — Katherine Lin
(74) *Attorney, Agent, or Firm* — Garg Law Firm, PLLC; Rakesh Garg; Michael O'Keefe

(57) ABSTRACT

For incident management, parsing, responsive to an incident ticket being opened relative to a first application. The parsing identifying a set of incident data. Identifying, using a dependency graph, a set of applications, wherein each application in the set of applications is dependent on the first application through at least one dependency relationship. Notifying, responsive to the incident ticket, a subset of a set of users of a second application about the incident ticket related to the first application, the second application being a member of the set of applications, the subset of the set of users of the second application performing a type of transaction with the second application wherein the type of transaction is indicated in a dependency relationship between the first application and the second application. Preventing a user in the subset of users from creating a second incident ticket.

18 Claims, 5 Drawing Sheets

INCIDENT MANAGEMENT FOR TRIAGING SERVICE DISRUPTIONS

BACKGROUND

The present invention relates generally to a method, system, and computer program product for incident management. More particularly, the present invention relates to a method, system, and computer program product for incident management for triaging service disruptions and multiple ticketing for the disruptions.

An application service provider (ASP) is a business that provides computer-based services to a website provider. The website provider can then provide the services to users over a network. An example of this business is that of providing access to an application program, for example, online banking using a standard protocol, for example, HTTP.

ASPs provide access to their services to website providers via 2-way, on-demand communication, i.e., in a symmetrical manner. The ASP network must be available and provide on-demand support for user requests for both data reads (e.g., actions related to data display and presentation) and data writes (e.g., actions related to data creation, updating, or deletion). An example of a data read (in an online banking application) would be looking up a user's current balance, and a data write example would be updating a user's address information.

Within the scope of the illustrative embodiments, any manner of using or operating the software application, locally or remotely over a network, in a standalone manner or in conjunction with one or more with other software applications. A customer, such as a business entity, operates their data processing systems and the applications therein to provide certain features and functions to their users. In providing such functions, the customer's system generates data, consumes data, and uses services provided by other systems and applications.

The ASP service must always be available and accessible. If the ASP service becomes unavailable or disrupted for any reason, the functionality provided to the website provider's network cannot be accessed by the user. If the service is unavailable or disrupted to deliver a desired performance, it is essential to restore the service to normal operation as quickly as possible.

When the service is unavailable or disrupted, an incident ticket is opened, and incident data reporting the incident is transmitted to the ASP. The incident data includes information, such as the service component involved, log data, conditions under which the incident occurred, the user's name and contact information, the incident description, the date and time of the incident report, or some combination of these and other incident related information.

Incident data can be reported in various manners, for example, walk-ups, self-service, phone calls, emails, support chats, and automated notices, such as network monitoring software or system scanning utilities.

Incident data is parsed by an incident management system and the incident data is identified, characterized and prioritized by the incident management system.

SUMMARY

The illustrative embodiments provide a method, system, and computer program product for incident management. An embodiment includes a method for incident management. The embodiment parses, responsive to an incident ticket being opened relative to a first application, to identify a set of incident data. The embodiment identifies, using a dependency graph, a set of applications, wherein each application in the set of applications is dependent on the first application through at least one dependency relationship. The embodiment notifies, responsive to the incident ticket, a subset of a set of users of a second application about the incident ticket related to the first application, the second application being a member of the set of applications, the subset of the set of users of the second application performing a type of transaction with the second application wherein the type of transaction is indicated in a dependency relationship between the first application and the second application. The embodiment prevents a user in the subset of users from creating a second incident ticket.

Another embodiment includes a computer program product for incident management, the computer program product comprising one or more computer-readable storage devices, and program instructions stored on at least one of the one or more storage devices.

Another embodiment includes a computer system for incident management, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
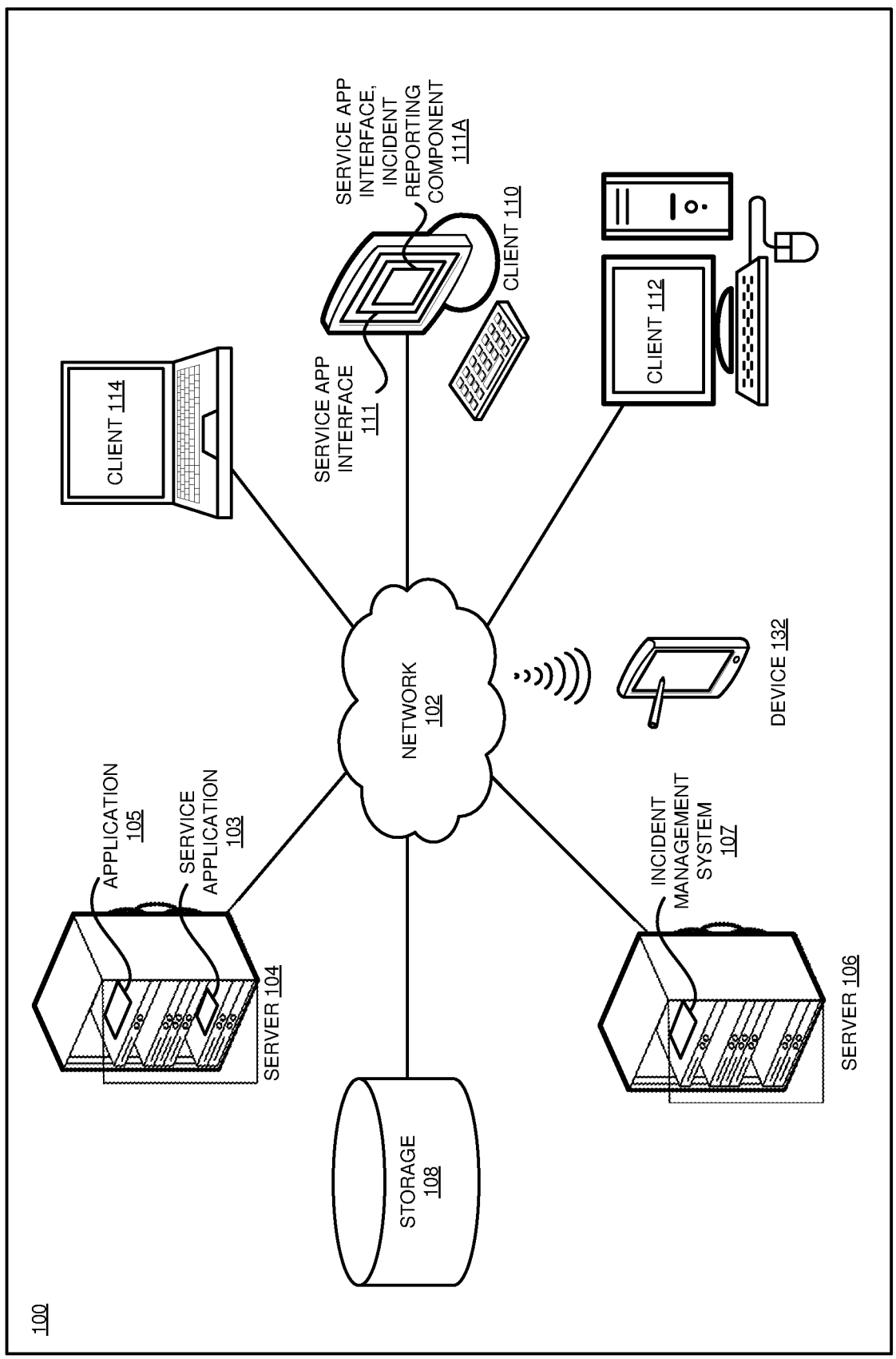
FIG. 1 depicts a block diagram of an incident management system in which illustrative embodiments may be implemented.

The illustrative embodiments recognize that there is a need to prevent multiple incident tickets being opened based on related disruptions. For example, by more than one user of a service provided by the ASP. In another example, an incident ticket is opened providing incident data of a disruption in a first service which may cause a disruption in a second, related service. The illustrative embodiment recognizes that the number of incident tickets can be reduced by preventing the opening of multiple incident tickets based on the same incident data. The illustrative embodiments provide notification to the service provider of the second application to prevent the service provider of the second application from opening an incident ticket for the related disruption. The notification alerts the service provider that the potential disruption is already being investigated.

In addition, many presently-available incident management systems allow multiple incident tickets to be opened for related disruptions and each incident ticket is investigated, resolved and closed. This increases ticket resolution cost and incident ticket volume, lowers the efficiency of the incident management and the quality of the service.

The illustrative embodiments recognize that the presently available tools or solutions do not address these needs or provide adequate solutions for these needs. The illustrative embodiments used to describe the invention generally address and solve the above-described problems and other problems related to incident management and triaging services disruptions. The illustrative embodiments provide a method, system, and computer program product to incident management and triaging services disruptions.

Hereinafter, a service provider functionality is referred to as a service without implying any limitation of providing such functionality only in the form of a service. Furthermore, the various embodiments are described using an example of an incident ticket generation service provided by a service provider system in the course of providing service management functionality. The incident ticket generation service example is not intended to be limiting. From this disclosure, those of ordinary skill in the art will be able to conceive many other services that can be used with an embodiment and the same are contemplated within the scope of the illustrative embodiments.

Furthermore, the various embodiments are described using an example of incident management by a service provider system in the course of providing service management functionality. The ticket generation service example is not intended to be limiting. From this disclosure, those of ordinary skill in the art will be able to conceive many other services that can be used with an embodiment and the same are contemplated within the scope of the illustrative embodiments.

These examples of incident management and reasons therefor are not intended to be limiting. From this disclosure, those of ordinary skill in the art will be able to conceive many other ways of modifying the incident management, and the same are contemplated within the scope of the illustrative embodiments.

Such manner of incident management is unavailable in presently available systems. Thus, a substantial advancement of such devices or data processing systems by executing a method of an embodiment is in reducing the time, cost and diagnosis during incident management.

The illustrative embodiments are described with respect to certain systems, services, APIs, parameters, records, data components, transformations, forwarding methods, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
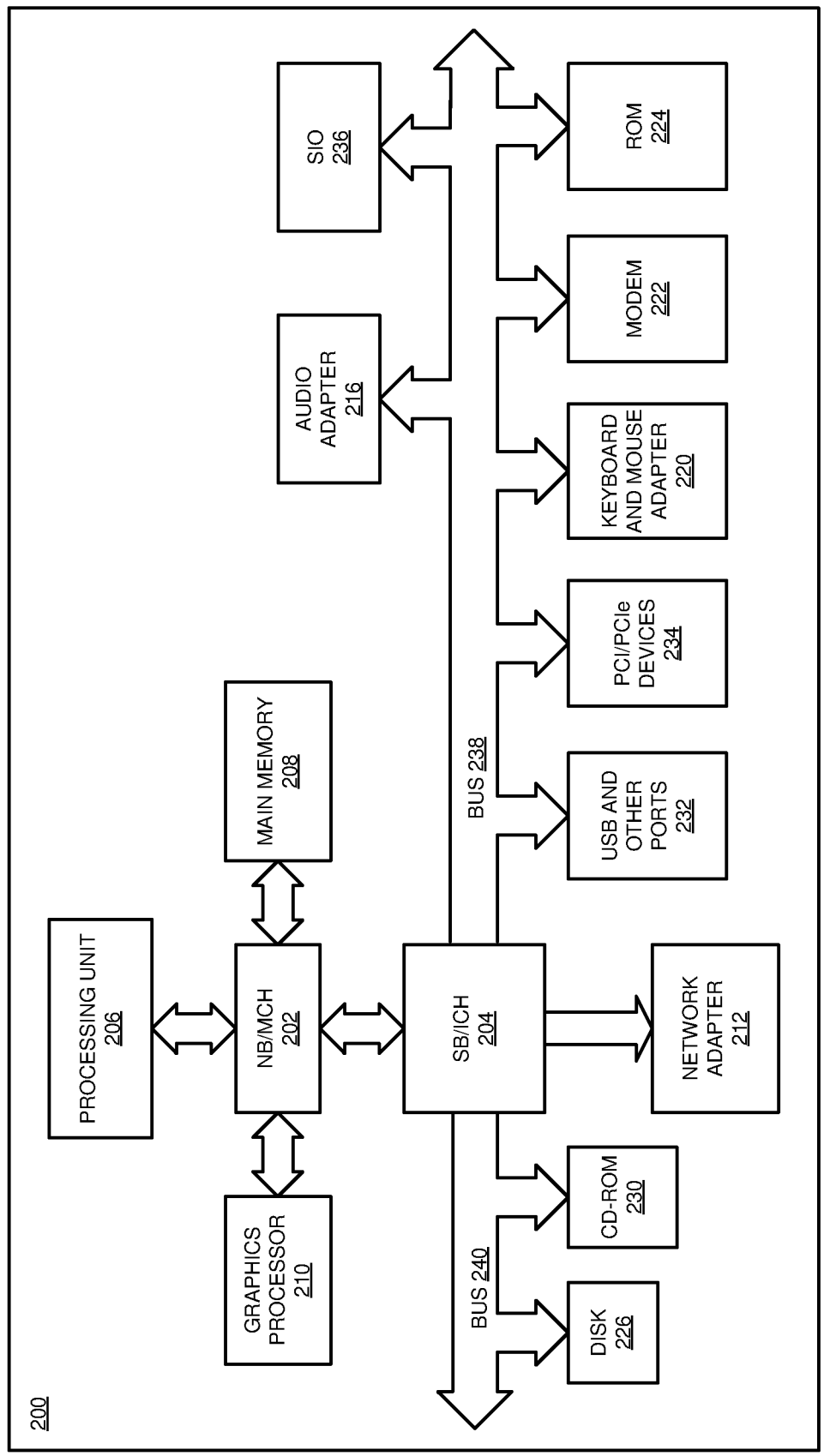
FIG. 2 depicts a block diagram of an incident management system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Servers 104 and 106 are coupled to network 102 along with storage unit 108. Software applications may execute any computer in data processing environment 100. For example, client 110, 112 and 114 are also coupled to network 102. A data processing system, such as servers 104 and 106, or clients 110, 112 and 114, may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112 and 114, are depicted as servers and users only as example and not to imply a limitation to a user-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Application 105 implements an embodiment described herein. Server 104 can be a service integration system or may be usable for executing a service application 103. Server 106 executes incident management system 107, which may be an application on the customer-side.

Client 110 operates service application interface 111 and service application interface incident reporting component 111A, which provides one or more services to incident management system 107. Incident data related to a service disruption is entered or uploaded into service application interface incident reporting component 111A.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a user-server environment in which the illustrative embodiments may be implemented. A user-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
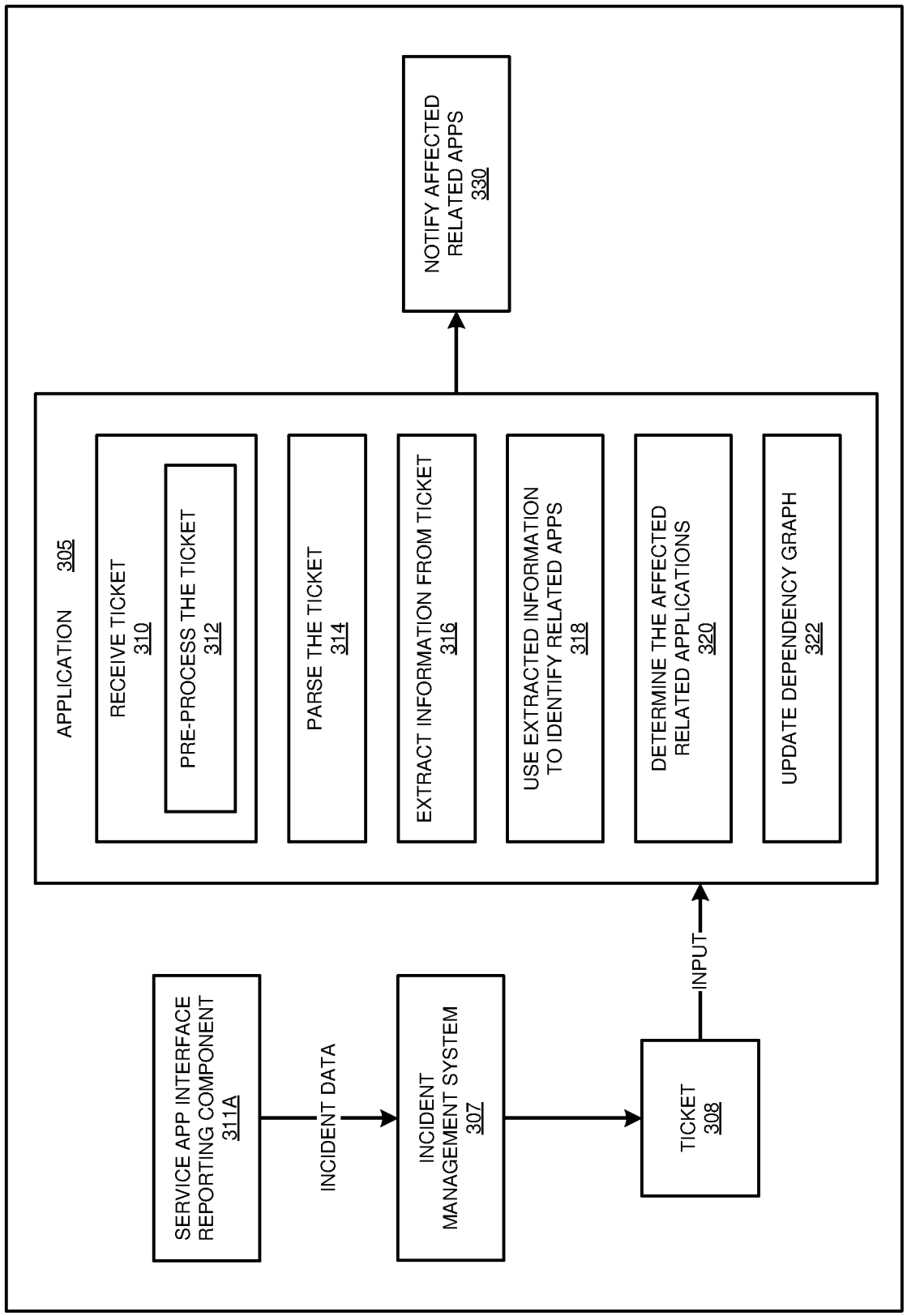
FIG. 3 depicts a flow chart of an example configuration for incident management in accordance with an illustrative embodiment.

With reference to FIG. 3, this figure depicts a flowchart of an example configuration for incident management for tri-aging service disruptions.

Application 305, which is an example of application 105 in FIG. 1, executes in server 304, which is an example of server 104 in FIG. 1. Incident management system 307 is an example of incident management system 107 in FIG. 1. Service application interface incident reporting component 311A is an example of service application interface incident reporting component 111A in FIG. 1.

Only as a non-limiting example to illustrate and describe an operation of an embodiment, consider that service application interface incident reporting component 111A transmits incident data of a service disruption to incident management system 307. The incident data may include information, for example, an area of the service application interface 111 effected, the date of the disruption, the type of the disruption, or the length of the disruption. In response to receiving the incident data, incident management system 307 provides a ticket generation functionality and generates a ticket 308 including the incident data.

The information from ticket 308 is transmitted to application 305. Application 305 receives the ticket 310. In an embodiment, the ticket may not be readable by application 305, for example, the ticket may be in another language or may be in the incorrect format. Application 305 will pre-process the ticket 312 to determine if the ticket needs to be reformatted or reentered.

Application 305 parses the ticket 314 to identify and extract information from the ticket 316. The information extracted from the ticket is parsed, utilizing a dependency graph, to identify related or dependent applications 318, as described in FIG. 4. The related application depends on the first application because of a data flow occurring between the first application and the related application during a performance of the type of transaction in the related application. Application 305 will determine if the related application is affected by the disruption 320. If the related application is determined to be affected by the disruption recoding in the incident data, the service provider for the related application will be notified 330 of the disruption and the potential disruption it may cause to that related application. If the related application is determined to be unaffected by the disruption recoding, the service provider in the related application will not be notified and the dependency graph will be updated 322. Notification to the service provider of the related application prevents the service provider of the related application from opening an incident ticket for a related disruption in the second service. The notification alerts the service provider that the disruption is already being investigated.

For example, in the banking industry, if a customer uses an atm, first application, to deposit a check and the deposit fails, application 305 will determine related applications that will potentially be affected by the failed deposit, for example, other checks deposited by other customers that day or the customer's online banking records. If the related applications are affected by the failed deposit, application 305 will notify the other banking customers that deposited checks and the customer via his online account.

Figure 4:
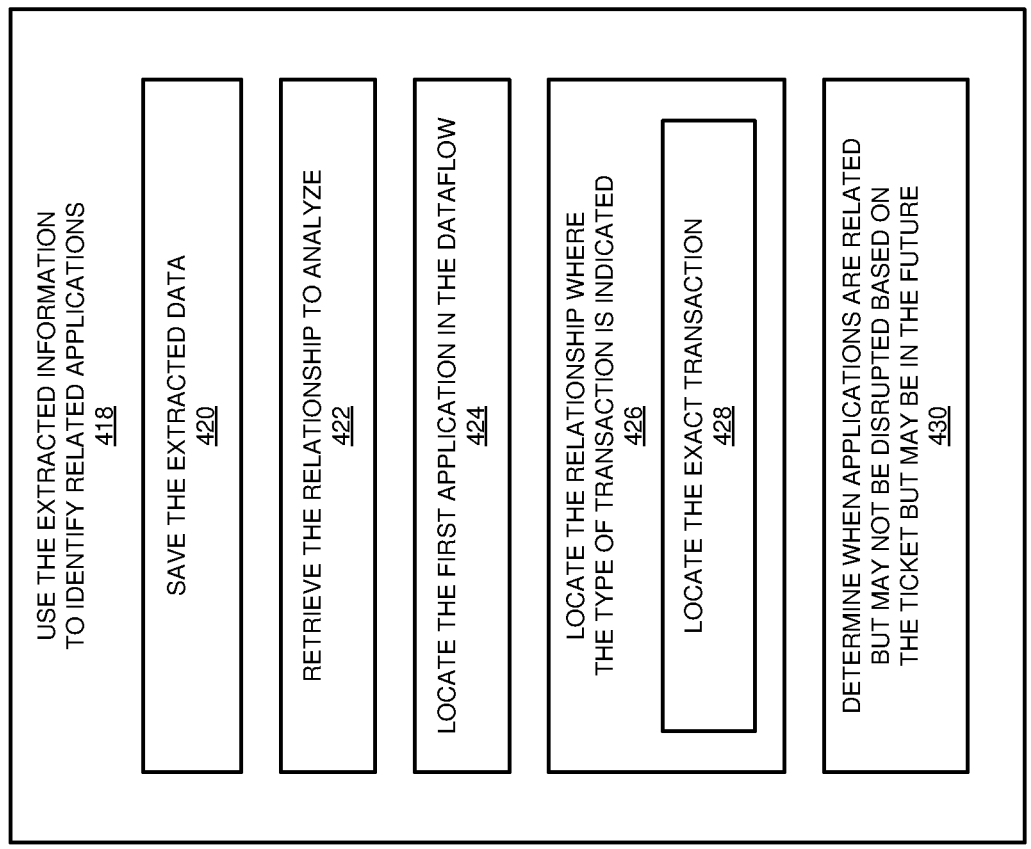
FIG. 4 depicts a block diagram of an incident management system in which illustrative embodiments may be implemented.

With reference to FIG. 4, this figure depicts a block diagram of an example process for using the extracted information from the ticket to identify related applications 418, which is the detailed implementation of extracted information from the ticket to identify related applications 318 in FIG. 3.

In an embodiment, the data extracted is saved to storage 420. This allows the extracted data to be retrieved and parsed during a potential future disruption to determine of the identified related application will be affected.

In an embodiment, the extracted information can retrieve the relationship between the related application 422 for analysis. In an embodiment, the extracted information can analyze the related application to locate the data flow occurring between the first application and the related application 424. The relationship between the first application and the related application is located during a performance of the type of transaction in the related application 426. In an embodiment, the exact transaction is in the related application 428. In an embodiment, the extracted information can identify if an application is related but may not be directly affected, for example, may be tangentially affected, by the disruption but may be affected by a future disruption 430.

Figure 5:
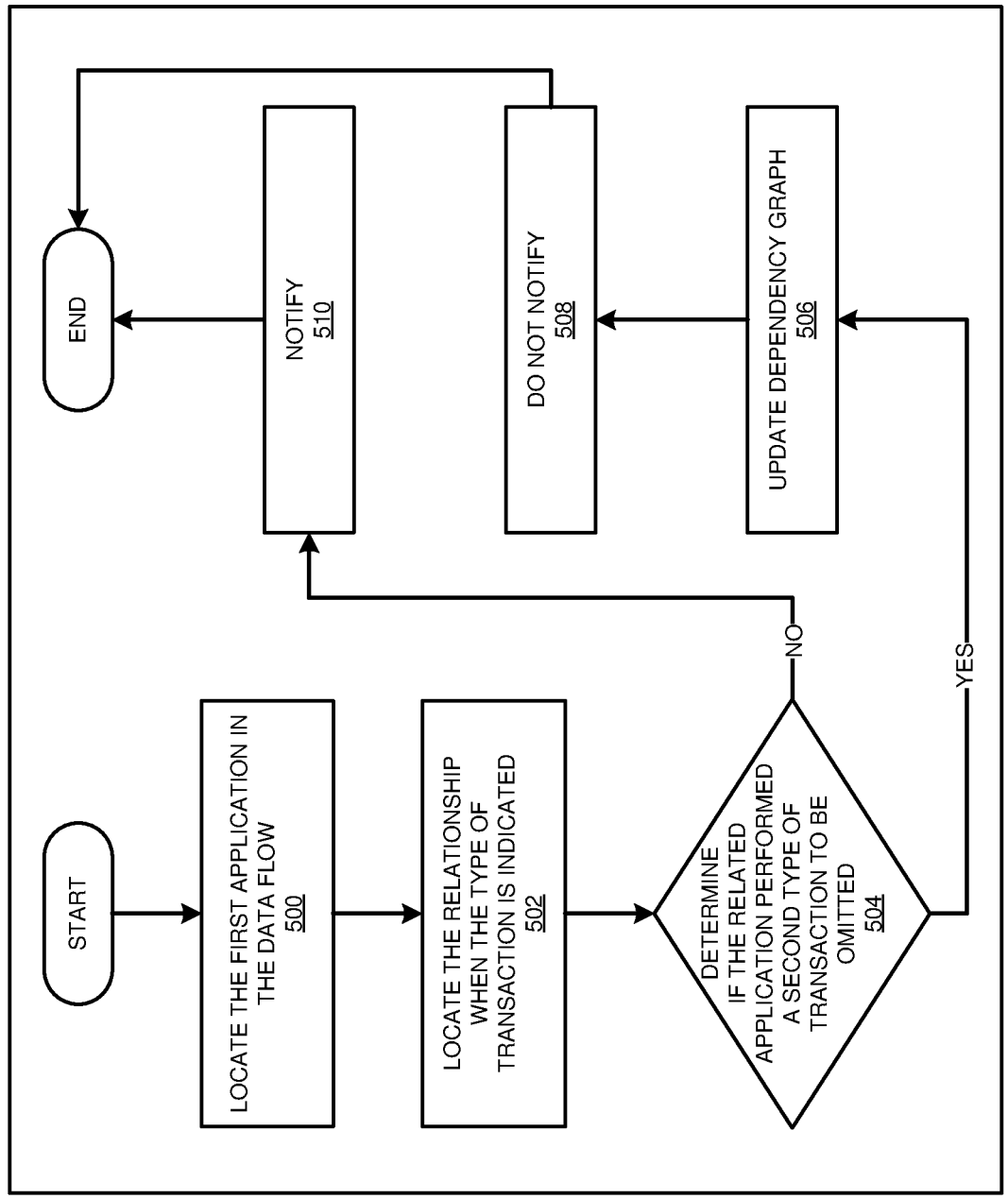
FIG. 5 depicts a flow chart of an example configuration for incident management in accordance with an illustrative embodiment.

With reference to FIG. 5, this figure depicts a flowchart of an example configuration of updating the dependency graph 506, which is an example of updating the dependency graph 322 in FIG. 3.

In an embodiment, the relationship between the first application and the related application is dynamic. The extracted information can analyze the related application to locate the data flow occurring between the first application and the related application 500. The relationship between the first application and the related application is located during a performance of the type of transaction in the related application 502. If, for example, a change made in the second application, for example, performing a second type of transaction relative to the first application, may avoid the possibility of a disruption of service in the related application 504. The second type of transaction causes the related application to be omitted from the dependency relationship between the first application and the related application. In that case, the dependency graph is updated 506 and the related application is omitted from the set of related applications to be notified 508. If there is no change made by the related application, the service provider of the related application is notified 510.

Thus, a computer implemented method, system or apparatus, and computer program product are provided in the illustrative embodiments for incident management. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for incident management, the computer-implemented method comprising:
   parsing, by a processor according to computer usable code and responsive to an incident ticket being opened relative to a first application, the parsing identifying a set of incident data;
   identifying, by the processor according to the computer usable code and using a dependency graph, a set of applications, wherein each application in the set of applications is dependent on the first application through at least one dependency relationship;
   notifying, by the processor according to the computer usable code and responsive to the incident ticket, a subset of a set of users of a second application about the incident ticket related to the first application, the second application being a member of the set of applications, the subset of the set of users of the second application performing a type of transaction with the second application wherein the type of transaction is indicated in a dependency relationship between the first application and the second application;
   preventing, by the processor according to the computer usable code, a user in the subset of users from creating a second incident ticket; and
   omitting from the notifying, by the processor according to the computer usable code, a second subset of the set of users of the second application, the omitting being responsive to the second subset of users performing a second type of transaction relative to the second application,
   wherein the second type of transaction is excluded from the dependency relationship between the first application and the second application, and
   wherein the computer usable code is downloaded over a network to a remote data processing system for use in a computer readable storage associated with the remote data processing system.

2. The method of claim 1, further comprising:
   including, as a part of the notifying, an indication of a likelihood of a disruption in the second application prior to the disruption occurring in the second application.

3. The method of claim 1, further comprising:
   transmitting, as a part of the notifying, incident information from the incident ticket to a service provider of the second application.

4. The method of claim 1, wherein the second application depends on the first application because of a data flow occurring between the first application and the second application during a performance of the type of transaction in the second application.

5. The method of claim 1, further comprising:
   storing the set of applications dependent on the first application for notifying responsive to a future incident ticket opened in the first application.

6. The method of claim 1, further comprising:
   extracting, as a part of the parsing, information from the incident data to identify related applications.

7. The method of claim 1, further comprising:
   locating in the related application, as a part of identifying, a type of transaction indicated in the incident data of the first application.

8. The method of claim 1, further comprising:
   updating the dependency graph, as part of identifying, based on the second subset of users performing a second type of transaction relative to the second application.

9. A computer program product for incident management, the computer program product comprising one or more computer-readable storage medium, and program instructions collectively stored on at least one of the one or more storage medium, the stored program instructions comprising:
   program instructions to identify, using a dependency graph, a set of applications, wherein each application in the set of applications is dependent on a first application through at least one dependency relationship;
   program instructions to notify, responsive to an incident ticket, a subset of a set of users of a second application about the incident ticket related to the first application, the second application being a member of the set of applications, the subset of the set of users of the second application performing a type of transaction with the second application wherein the type of transaction is indicated in a dependency relationship between the first application and the second application;
   program instructions to prevent a user in the subset of users from creating a second incident ticket; and
   program instructions to omit from the notifying, a second subset of the set of users of the second application, the omitting being responsive to the second subset of users performing a second type of transaction relative to the second application,
   wherein the second type of transaction is excluded from the dependency relationship between the first application and the second application, and
   wherein the program instructions are downloaded over a network to a remote data processing system for use in a computer readable storage associated with the remote data processing system.

10. The computer program product of claim 9, further comprising:

program instructions to notify an indication of a likelihood of a disruption in the second application prior to the disruption occurring in the second application.

11. The computer program product of claim 9, further comprising:
program instructions to update the dependency graph, as part of identifying, based on the second subset of users performing a second type of transaction relative to the second application.

12. The computer program product of claim 9, further comprising:
program instructions to transmit, as a part of the notifying, incident information from the incident ticket to a service provider of the second application.

13. The computer program product of claim 9, wherein the second application depends on the first application because of a data flow occurring between the first application and the second application during a performance of the type of transaction in the second application.

14. The computer program product of claim 9, further comprising:
program instructions to store the set of applications dependent on the first application for notifying responsive to a future incident ticket opened in the first application.

15. The computer program product of claim 9, further comprising:
program instructions to transmit a notification to a user of the dependent application of a potential disruption prior to a service desk of the service provider of the dependent application opening a ticket.

16. The computer program product of claim 9, wherein the program instructions are stored in the one or more computer readable storage medium in a data processing system, and wherein the program instructions are transferred over a network from a remote data processing system.

17. The computer program product of claim 9, wherein the program instructions are stored in the one or more computer readable storage medium in a server data processing system.

18. A computer system for incident management, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to identify, using a dependency graph, a set of applications, wherein each application in the set of applications is dependent on a first application through at least one dependency relationship;

program instructions to notify, responsive to an incident ticket, a subset of a set of users of a second application about the incident ticket related to the first application, the second application being a member of the set of applications, the subset of the set of users of the second application performing a type of transaction with the second application wherein the type of transaction is indicated in a dependency relationship between the first application and the second application;

program instructions to prevent a user in the subset of users from creating a second incident ticket; and program instructions to omit from the notifying, a second subset of the set of users of the second application, the omitting being responsive to the second subset of users performing a second type of transaction relative to the second application, wherein the second type of transaction is excluded from the dependency relationship between the first application and the second application, and wherein the program instructions are downloaded over a network to a remote data processing system for use in a computer readable storage associated with the remote data processing system.

\* \* \* \* \*